(12) United States Patent
Zeng et al.

(10) Patent No.: US 12,242,028 B2
(45) Date of Patent: Mar. 4, 2025

(54) IMAGING LENS SYSTEM, CAMERA MODULE AND FINGERPRINT RECOGNITION MODULE

(71) Applicant: JIANGXI LIANYI OPTICS CO., LTD., Nanchang (CN)

(72) Inventors: Haojie Zeng, Nanchang (CN); Yilong Wang, Nanchang (CN)

(73) Assignee: JIANGXI LIANYI OPTICS CO., LTD., Nanchang (CN)

( * ) Notice: Subject to any disclaimer, the term of this patent is extended or adjusted under 35 U.S.C. 154(b) by 495 days.

(21) Appl. No.: 17/578,501

(22) Filed: Jan. 19, 2022

(65) Prior Publication Data
US 2022/0137338 A1     May 5, 2022

Related U.S. Application Data

(63) Continuation of application No. PCT/CN2020/078021, filed on Mar. 5, 2020.

(30) Foreign Application Priority Data

Jul. 23, 2019    (CN) .......................... 201910664291.7

(51) Int. Cl.
*G02B 13/18*     (2006.01)
*G02B 9/12*     (2006.01)
(Continued)

(52) U.S. Cl.
CPC ........... *G02B 13/0035* (2013.01); *G02B 9/12* (2013.01); *G06V 10/147* (2022.01); *G06V 40/1318* (2022.01); *H04N 23/50* (2023.01)

(58) Field of Classification Search
CPC . G02B 9/00; G02B 9/12; G02B 13/00; G02B 13/001; G02B 13/0015;
(Continued)

(56) References Cited

U.S. PATENT DOCUMENTS 9,977,221 B2 *   5/2018   Huang ..................... G02B 9/16
11,143,842 B2 *   10/2021   Chang .................... G02B 13/06
(Continued)

FOREIGN PATENT DOCUMENTS

CN     201936063 U     8/2011
CN     105988201 A     10/2016
(Continued)

OTHER PUBLICATIONS

SIPO, First Office Action for CN Application No. 201910664291.7, Sep. 10, 2019.
(Continued)

*Primary Examiner* — Thong Q Nguyen

(57) ABSTRACT

An imaging lens system, from an object side to an imaging plane, sequentially includes: a flat glass; a first lens with a negative focal power, a convex object side surface and a concave image side surface; a second lens with a positive focal power, a convex object side surface and a concave image side surface; a stop; a third lens with a positive focal power and a convex image side surface. The imaging lens system meets expressions: f/EPD≤1.64; 0<BFL/IH<0.2; where f represents an effective focal length of the imaging lens system, and EPD represents an entrance pupil diameter of the imaging lens system; BFL represents a distance from a vertex of the image side surface of the third lens to the imaging plane on the optical axis, and IH represents the maximum image height of the imaging lens system.

18 Claims, 13 Drawing Sheets

(51) Int. Cl.
  *G02B 13/00* (2006.01)
  *G06V 10/147* (2022.01)
  *G06V 40/13* (2022.01)
  *H04N 23/50* (2023.01)

(58) Field of Classification Search
  CPC .............. G02B 13/002; G02B 13/0035; G02B 13/008; G02B 13/14; G02B 13/143; G02B 13/146; G02B 13/18; G02B 27/0025; G06V 10/147; G06V 40/1318
  USPC .................................................. 359/716, 784
  See application file for complete search history.

(56) References Cited

U.S. PATENT DOCUMENTS

| | | |
|---|---|---|
| 2018/0307010 A1 | 10/2018 | Takahiro et al. |
| 2019/0154978 A1 | 5/2019 | Kuan et al. |

FOREIGN PATENT DOCUMENTS

| | | |
|---|---|---|
| CN | 108592867 A | 9/2018 |
| CN | 109975953 A | 7/2019 |
| JP | 2006162829 A | 6/2006 |
| JP | 2008040317 A | 2/2008 |

OTHER PUBLICATIONS

SIPO, Office Action issued for CN Application No. 201910664291.7, Sep. 23, 2019.
WIPO, Written opinion of the International Search Authority for PCT Application No. PCT/CN2020/078021, May 27, 2020.
WIPO, International Search Report for PCT Application No. PCT/CN2020/078021, May 27, 2020.

* cited by examiner

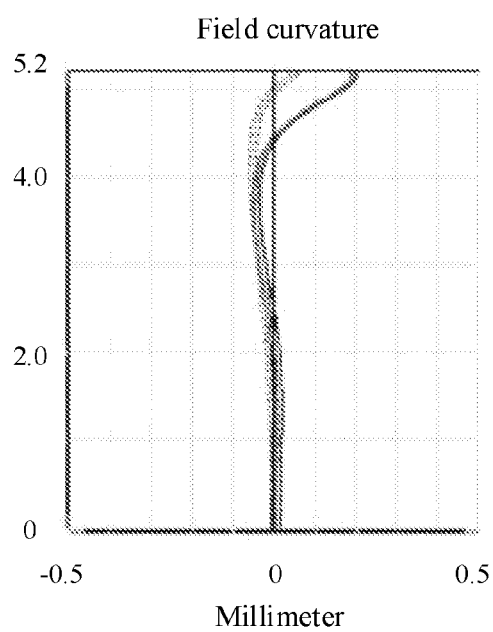
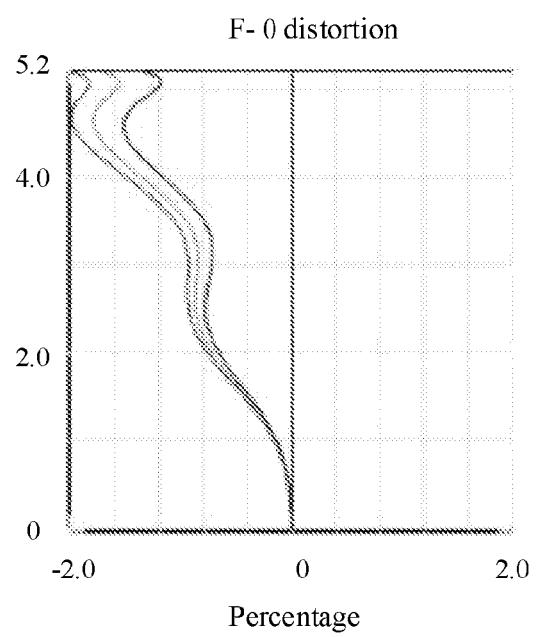
FIG. 8a
FIG. 8b

IMAGING LENS SYSTEM, CAMERA MODULE AND FINGERPRINT RECOGNITION MODULE

CROSS-REFERENCE TO RELATED APPLICATION

This application is a continuation-in-part of an international application NO. PCT/CN2020/078021 filed on Mar. 5, 2020. This international application NO. PCT/CN2020/078021 claims priority to a CN application No. 2019106642917 filed on Jul. 23, 2019. The entirety of the above-mentioned application is hereby incorporated by reference for all purposes.

TECHNICAL FIELD

The disclosure relates to the field of optical lens, and more particularly, to an imaging lens system, a camera module, and a fingerprint recognition module.

BACKGROUND

Fingerprint image recognition technology is the technology that collects fingerprint images of human bodies by the fingerprint recognition device, and then compares the fingerprint images with existing fingerprint image information in the system to realize identity recognition. Due to the convenience of using the technology and the uniqueness of human fingerprints, the fingerprint identification technology has been used in various fields, such as security check area as public security, customs, etc., access control systems of buildings, consumer product area as personal computers, cell phones, etc.

The imaging lens system is commonly used as a part of the under-screen fingerprint identification device. The fingerprint information (endpoints and bifurcation points of fingerprint texture which are visible to human eyes) is collected by the imaging principle, processed by algorithms to sharpen the collected information of peak valley, and compared with information in fingerprint database to achieve an effect of fingerprint identification. However, the existing imaging lens system still has a problem of relatively long total optical length, which is not conducive to the development of lens miniaturization.

SUMMARY

An embodiment of the disclosure provides an imaging lens system. The imaging lens system, from an object side to an imaging plane, sequentially includes: a flat glass; a first lens, where the first lens has a negative focal power, an object side surface of the first lens is convex, and an image side surface of the first lens is concave; a second lens, where the second lens has a positive focal power, an object side surface of the second lens is convex, and an image side surface of the second lens is concave; a stop; a third lens, where the third lens has a positive focal power, an image side surface of the third lens is convex. The imaging lens system meets the expression: $f/EPD \leq 1.64$; where f represents an effective focal length of the imaging lens system, and EPD represents an entrance pupil diameter of the imaging lens system. The imaging lens system meets the expression: $0 < BFL/IH < 0.2$, where BFL represents a distance from a vertex of the image side surface of the third lens to an imaging plane on the optical axis, and IH represents the maximum image height of the imaging lens system. The imaging lens system further meets the expression: $-0.73 < (CT3-CT1)/(ET1-ET3) < -0.45$, where CT3 represents a center thickness of the third lens, CT1 represents a center thickness of the first lens, ET3 represents an edge thickness of the third lens, and ET1 represents an edge thickness of the first lens.

An embodiment of the disclosure provides a camera module. The camera module includes an imaging lens system and an image sensor opposite to the imaging lens system. From an object side to an imaging plane, the imaging lens system sequentially comprises: a flat glass, a first lens, a second lens, a stop and a third lens. The first lens has a negative focal power, an object side surface of the first lens is convex, an image side surface of the first lens is concave. The second lens with a positive focal power, an object side surface of the second lens is convex, an image side surface of the second lens is concave. The stop is disposed between the second lens and a third lens. The third lens has a positive focal power, an image side surface of the third lens is convex. The imaging lens system meets the expression: $f/EPD \leq 1.64$; where f represents an effective focal length of the imaging lens system, and EPD represents an entrance pupil diameter of the imaging lens system.

An embodiment of the disclosure provides a fingerprint recognition module. The fingerprint recognition module includes a camera module, a memory and a processor, the memory and the camera module are electrically connected with the processor, the memory is configured to store image data, the processor is configured to process the image data. The camera module includes an imaging lens system and an image sensor, the image sensor is opposite to the imaging lens system and configured to sense and generate the image data. From an object side to an imaging side, the imaging lens system sequentially includes: a flat glass; a first lens, where the first lens has a negative focal power, an object side surface of the first lens is convex, and an image side surface of the first lens is concave; a second lens, where the second lens has a positive focal power, an object side surface of the second lens is convex, and an image side surface of the second lens is concave; a stop; a third lens, where the third lens has a positive focal power, an image side surface of the third lens is convex. The imaging lens system meets the expression: $f/EPD \leq 1.64$; where f represents an effective focal length of the imaging lens system, and EPD represents an entrance pupil diameter of the imaging lens system. The imaging lens system meets the expression: $0 < BFL/IH < 0.2$; where BFL represents a distance from a vertex of the image side surface of the third lens to an imaging plane on the optical axis, and IH represents the maximum image height of the imaging lens system.

BRIEF DESCRIPTION OF THE DRAWINGS

The above and/or additional aspects and advantages of the disclosure will be more clearly and more easily to understood from the description of the embodiments with reference to the following drawings.

FIG. 8a is a diagram showing field curvature curves of the imaging lens system according to the second embodiment of the disclosure;

FIG. 8b is a diagram showing distortion curves of the imaging lens system according to the second embodiment of the disclosure;

DETAILED DESCRIPTION OF PREFERRED EMBODIMENTS

Figure 1:
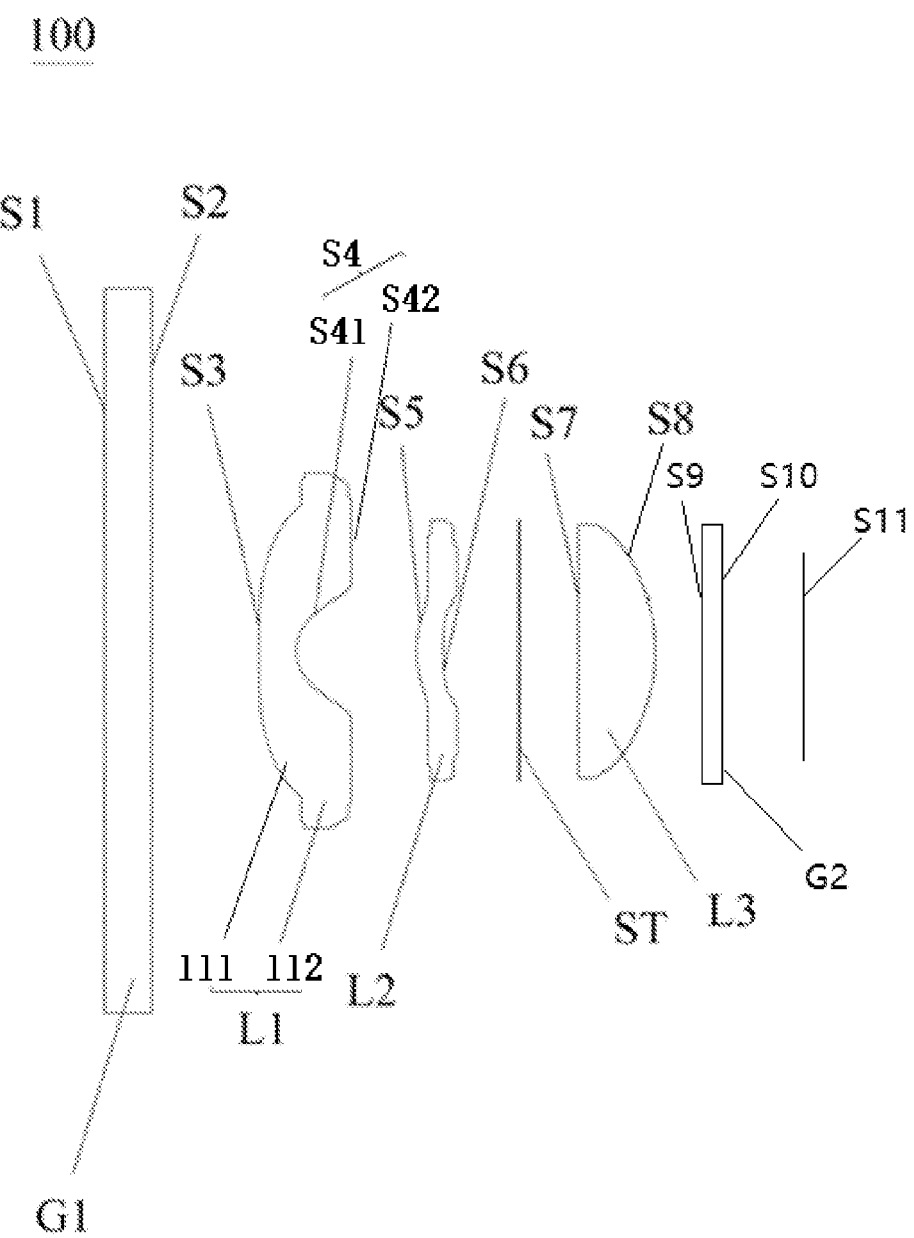
FIG. 1 is a schematic structural diagram of an imaging lens system according to a first embodiment of the disclosure.
Figure 2:
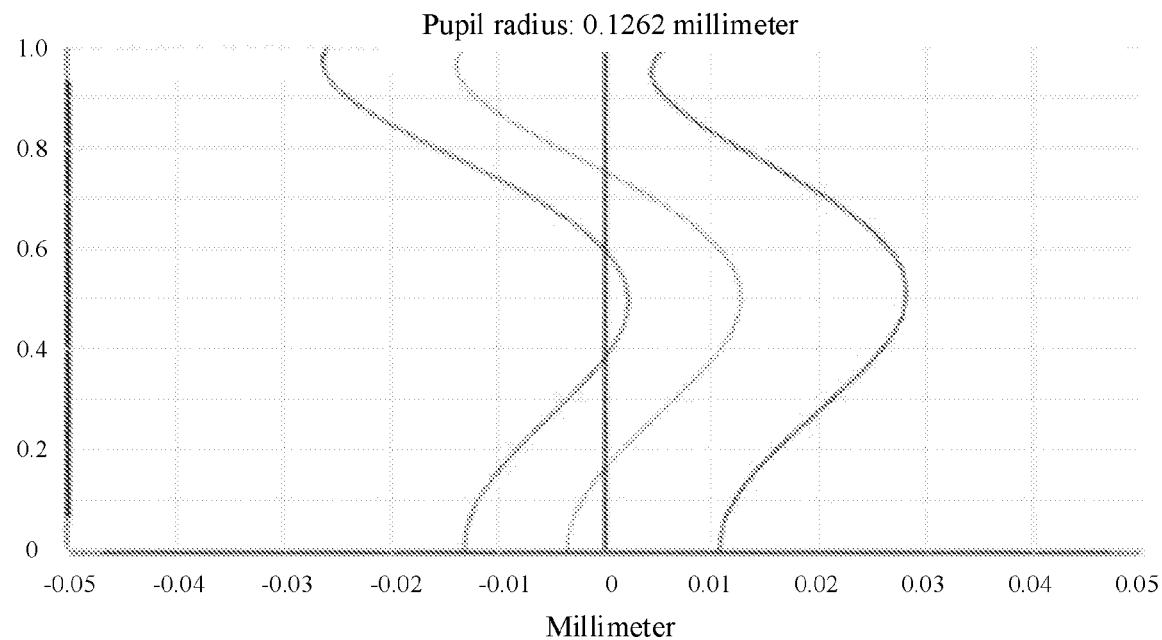
FIG. 2 is a diagram showing longitudinal aberration curves of the imaging lens system according to a first embodiment of the disclosure.
Figure 3:
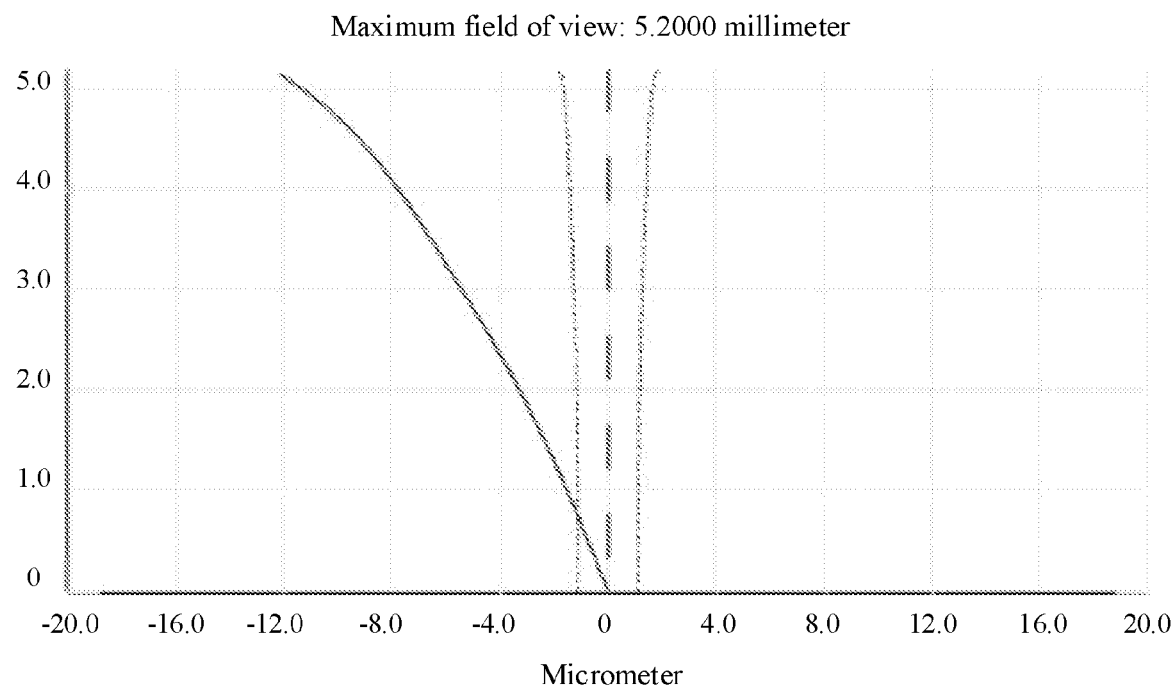
FIG. 3 is a diagram showing a lateral chromatic aberration curve of the imaging lens system according to the first embodiment of the disclosure.
Figure 4A:
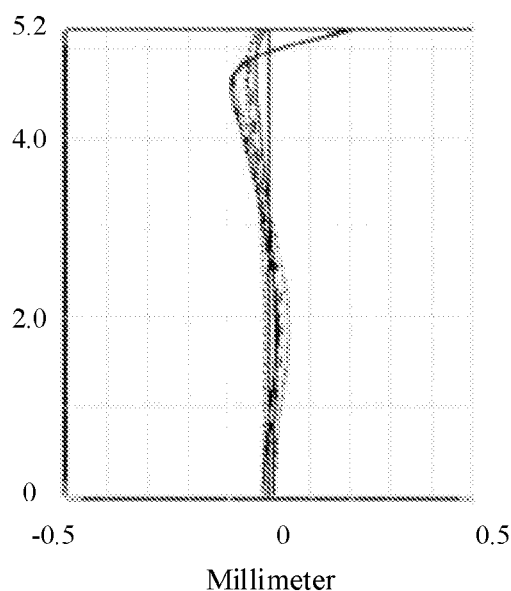
FIG. 4a is a diagram showing field curvature curves of the imaging lens system according to the first embodiment of the disclosure.
Figure 4B:
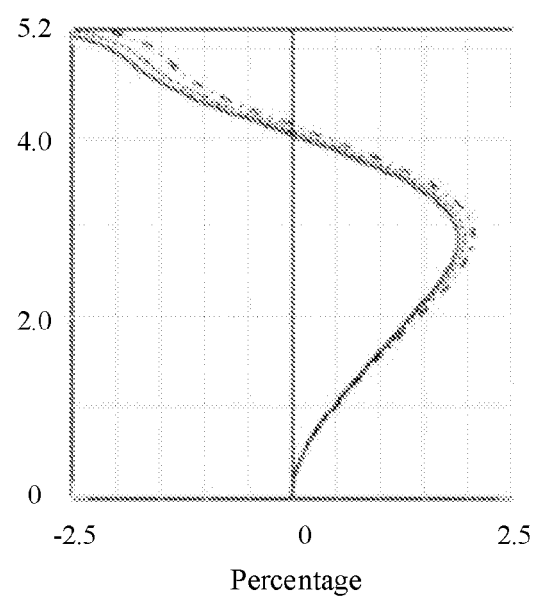
FIG. 4b is a diagram showing distortion curves of the imaging lens system according to the second embodiment of the disclosure.

In order to facilitate the understanding of the object, features and advantages of the disclosure, the disclosure will be described in detail hereinafter with reference to the accompanying drawings. Several embodiments of the disclosure are illustrated in the drawings. However, the disclosure may be implemented in many different manners and is not limited to the embodiments described herein. On the contrary, these embodiments are provided to make the disclosure more thorough and comprehensive.

Unless defined otherwise, all technical and scientific terms used herein have the same meaning as commonly understood by one of ordinary skill in the art to which this invention belongs. The terminology used herein in the description of the present invention is only for the purpose of describing specific embodiments, and is not intended to limit the present disclosure. The term "and/or" as used herein includes any and all combinations of one or more of the associated listed items.

An imaging lens system, from an object side to an imaging plane, sequentially includes: a flat glass, a first lens, a second lens, a stop and a third lens. The first lens has a negative focal power, an object side surface of the first lens is convex, and an image side surface of the first lens is concave. An object side surface of the second lens is convex, and an image side surface of the second lens is concave. The third lens has a positive focal power, an image side surface of the third lens is convex. An effective focal length represented by f and an entrance pupil diameter represented by EPD of the imaging lens system meet the expression: $f/EPD \leq 1.64$.

In some embodiments, the imaging lens system meets the expression:

$$0.17 < (SAG12 - SAG11)/CT1 < 0.43; \quad (1)$$

where SAG12 represents a sagittal depth of the image side surface of the first lens, SAG11 represents a sagittal depth of the object side surface of the first lens, and CT1 represents the center thickness of the first lens.

It can be understood that, the sagittal depth, which is also referred to as vector height, for a circular segment means a distance from the midpoint of the arc in the circular segment to the corresponding chord. In the embodiments, SAG12 refers to a distance from the geometric center of the image side surface of the first lens to the corresponding chord. SAG11 refers to a distance from the geometric center of the object side surface of the first lens to the corresponding chord.

The negative focal power of the first lens is relatively large, so lights with large field can be dispersed by the first lens and then enter into the system without a large angel redirection, thereby ensuring that there is no need to correct large high-order aberrations of large field In some embodiments, the imaging lens system meets the expression:

$$1.36 < f3/f < 1.56; \quad (2)$$

where f3 represents an effective focal length of the third lens, and f represents an effective focal length of the imaging lens system.

Satisfying the above expression (2) is beneficial for reducing spherical aberration and shortening the length of the system. The spherical aberration causes image blurring, due to light rays focus at different points.

In some embodiments, the imaging lens system meets the expression:

$$(ND3 - ND2)/(VD3 - VD2) < 0; \quad (3)$$

where ND3 represents a refractive index of the third lens, ND2 represents a refractive index of the second lens, VD3 represents an abbe number of the third lens, and VD2 represents an abbe number of the second lens.

Satisfying the above expression (3) can effectively shorten the total optical length of the system, thereby realizing the miniaturization of the system.

In some embodiments, the imaging lens system meets the expression:

$$0.3<f3/f2<0.4; \tag{4}$$

where f2 represents an effective focal length of the second lens.

Satisfying the above expression (4) can appropriately design the focal powers of the imaging lens system and reduce the difficulty of aberration correction, thereby achieving better quality of the system.

In some embodiments, the imaging lens system meets the expression:

$$-2<(R32-R31)/(R32+R31)<-1.3; \tag{5}$$

where R32 represents a radius of curvature of the image side surface of the third lens, and R31 represents a radius of curvature of an object side surface of the third lens.

Satisfying the above expression (5), the system has a larger NA value (numerical aperture) and the resolution of the system is improved.

In some embodiments, the imaging lens system meets the expression:

$$-0.73<(CT3-CT1)/(ET1-ET3)<-0.45; \tag{6}$$

where CT3 represents a center thickness of the third lens, CT1 represents a center thickness of the first lens, ET3 represents an edge thickness of the third lens, and ET1 represents an edge thickness of the first lens.

Satisfying the above expression (6) is beneficial for correcting the field curvature and the chromatic aberration.

In some embodiments, the imaging lens system meets the expression:

$$0<BFL/IH<0.2; \tag{7}$$

where BFL represents a distance from a vertex of the image side surface of the third lens to the imaging plane on the optical axis, and IH represents the maximum image height of the imaging lens system.

Satisfying the above expression (7) can effectively shorten the total optical length of the system, thereby realizing the miniaturization of the system.

In some embodiments, shapes of aspherical surfaces of the imaging lens system meet the following expression:

$$z = \frac{ch^2}{1+\sqrt{1-(1+k)c^2h^2}} + Bh^4 + Ch^6 + Dh^8 + Eh^{10} + Fh^{12} + Gh^{14} + Hh^{16};$$

where z represents a vector height between a position on a surface and a vertex of the surface along an optical axis, c represents a curvature of the vertex of the surface, k represents a quadratic surface coefficient, h represents a distance between the optical axis and the position on the surface, B represents a fourth order surface coefficient, C represents a sixth order surface coefficient, D represents an eighth order surface coefficient, E represents a tenth order surface coefficient, F represents a twelfth order surface coefficient, G represents a fourteenth order surface coefficient, and H represents a sixteenth order surface coefficient.

In some embodiments, the imaging lens system meets the expression:

$$R11>R12; \tag{8}$$

where R11 represents a radius of curvature of the object side surface of the first lens and R12 represents a radius of curvature of the image side surface of the first lens.

In some embodiments, the imaging lens system meets the expression:

$$CT1<CT3; \tag{9}$$

In some embodiments, the imaging lens system meets the expression:

$$CT1<ET1; \tag{10}$$

In some embodiments, the imaging lens system meets the expressions:

$$D1>D2;$$

$$D1>D3; \tag{11}$$

where D1 represents the maximum diameter of the first lens, D2 represents the maximum diameter of the second lens, and D3 represents the maximum diameter of the third lens.

In some embodiments, the imaging lens system further includes an infrared cut-off filter, which is disposed between the third lens and the imaging plane.

In some embodiments, the imaging lens system meets the expression:

$$f<1.0 \text{ mm};$$

$$FOV>100°;$$

where FOV represents a maximum field of view of the imaging lens system.

The foregoing optical imaging lens includes: the first lens, where the first lens has a negative focal power, an object side surface of the first lens is convex, and an image side surface of the first lens is concave; the second lens, where an object side surface of the second lens is convex, and an image side surface of the second lens is concave; the third lens, where the third lens has a positive focal power, an image side surface of the third lens is convex; the stop disposed between the second lens and the third lens. The effective focal length represented by f and the entrance pupil diameter represented by EPD of the imaging lens system meet the expression: f/EPD≤1.64. By appropriately matching and defining each lens and the stop, the imaging lens system achieves a relative short total optical length, thereby realizing the miniaturization of the system.

The disclosure is further illustrated below in a number of embodiments. In each of the following embodiments, the thickness and curvature radius of each lens of the imaging lens system are different, and specific differences can be found in parameter tables for each embodiment. The following embodiments are only the preferred embodiments of the disclosure, but cannot limit implementation manners of the disclosure. Any other changes, substitutions, combinations or simplifications without departing from innovation of the disclosure should be regarded as equivalent substitutions, which are included in the protection scope of the disclosure.

Embodiment 1

Please refer to FIG. 1, a first embodiment of the disclosure provides an imaging lens system 100. From a measured object side to an image side, the imaging lens system 100 sequentially includes: a flat glass G1, a first lens L1, a second lens L2, a stop ST and a third lens L3.

The flat glass G1 has an object side surface S1 and an image side surface S2.

The first lens L1 has a negative focal power. The first lens L1 has an object side surface S3 and an image side surface S4, the object side surface S3 is convex, and the image side surface S4 is concave.

The second lens L2 has a positive focal power. The second lens L2 has an object side surface S5 and an image side surface S6, the object side surface S5 is convex, and the image side surface S6 is concave.

The third lens L3 has a positive focal power. The third lens L3 has an object side surface S7 and an image side surface S8, the object side surface S7 is convex, and the image side surface S8 is convex.

The first lens L1 includes an optical portion III and an engaging portion 112. The image side surface S3 and the object side surface S4 of the first lens L1 refer to two opposite side surfaces of the optical portion 111. The image side surface S4 of the first lens L1 includes a curved surface S41 and an annular flat surface S42. The curved surface S41 locates at a central portion of the image surface S4 of the first lens L1, and the annular flat surface S42 surrounds the curved surface S41. A curvature of the curved surface S41 is larger than that of the object side surface S3 of the first lens L1.

The imaging lens system 100 provided in the first embodiment of the disclosure follows those represented in the Table 1-1 and Table 1-2. The imaging lens system 100 has a focal length f of 0.39 mm, a total optical length of 5.0 mm, an aperture number F # of 1.6, and a field of view 2θ of 132°. Aspheric surfaces of the three lenses of the present disclosure do not include the twelfth order, the fourteenth order and the sixteenth order surface coefficient.

Please refer to the Table 1-1, relevant parameters of every lens of the imaging lens system 100 provided in this embodiment are shown, where r represents a radius of curvature, d represents a surface spacing, n represents a refractive index of the material, and Vd represents an abbe number of the material. It should be noted that the surface spacing refers to the distance between adjacent surfaces along the optical axis. For example, the surface spacing of object side surface S1 refers to the distance between the object side surface S1 and the image side surface S2 of the flat glass G along the optical axis, and the surface spacing of image side surface S2 refers to the distance between the image side surface S2 and the object side surface S3 of the first lens L1 along the optical axis.

TABLE 1-1

| Surface No. | | Radius of curvature r | Surface Spacing d | Index of refraction $n_d$ | Abbe number Vd |
|---|---|---|---|---|---|
| | Object surface | — | | | |
| S1 | Flat glass G1 | Infinity | 1.465 | 1.5 | 64.1 |
| S2 | | Infinity | 1.028701 | | |
| S3 | First Lens L1 | 6.598231 | 0.293579 | 1.54 | 55.9 |
| S4 | | 0.355984 | 0.428278 | | |
| S5 | Second lens L2 | 1.046436 | 0.282407 | 1.66 | 20.3 |
| S6 | | 7.389035 | 0.113356 | | |
| ST | Stop ST | Infinity | 0.041537 | | |
| S7 | Third lens L3 | 3.120103 | 0.470763 | 1.64 | 23.5 |

TABLE 1-1-continued

| Surface No. | | Radius of curvature r | Surface Spacing d | Index of refraction $n_d$ | Abbe number Vd |
|---|---|---|---|---|---|
| S8 | | −0.42748 | 0.371305 | | |
| S9 | Infrared cut-off filter G2 | Infinity | 0.145 | 1.52 | 54.5 |
| S10 | | Infinity | 0.306081 | | |
| S11 | Imaging plane | Infinity | | | |

Please refer to the Table 1-2, the surface coefficients of every aspherical surface of the imaging lens system 100 provided in this embodiment are shown.

TABLE 1-2

| Surface No. | k | $A_4$ | $A_6$ | $A_8$ | $A_{10}$ |
|---|---|---|---|---|---|
| S3 | 1103.73 | 0.1777 | −0.0801 | 0.0024 | 0.0154 |
| S4 | −0.5819 | −0.3372 | 0.6946 | 1.3113 | −64.1687 |
| S5 | −3.114 | −1.3227 | 0.2245 | 11.3728 | −17.6238 |
| S6 | −0.075 | −1.0346 | −0.2768 | 214.9679 | −926.3660 |
| S7 | 1.562 | −3.8566 | 74.0742 | −880.5374 | 3604.9737 |
| S8 | −0.285 | 0.9115 | −5.3404 | 45.0516 | −156.0262 |

In the above table, $A_4$ represents a fourth order aspherical surface coefficient, $A_6$ represents a sixth order aspherical surface coefficient, $A_8$ represents an eighth order aspherical surface coefficient, and $A_{10}$ represents a tenth order aspherical surface coefficient.

In this embodiment, the curves of the longitudinal aberration, the lateral chromatic aberration, the field curvature and the distortion are shown in FIG. 2, FIG. 3, FIG. 4a and FIG. 4b, respectively. The smaller data range of image points, the better performance of the system. From FIG. 2 to FIG. 4b, it is apparent that the longitudinal aberration, the lateral chromatic aberration, the field curvature and the distortion can be well corrected.

Embodiment 2

Figure 5:
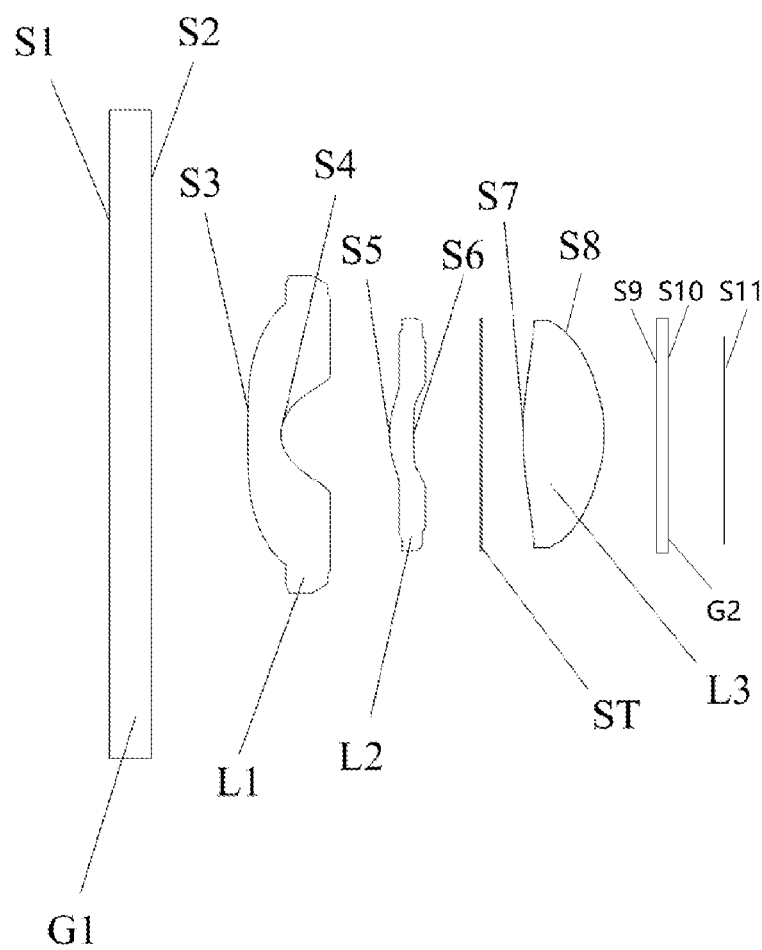
FIG. 5 is a schematic structural diagram of an imaging lens system according to a second embodiment of the disclosure.
Figure 6:
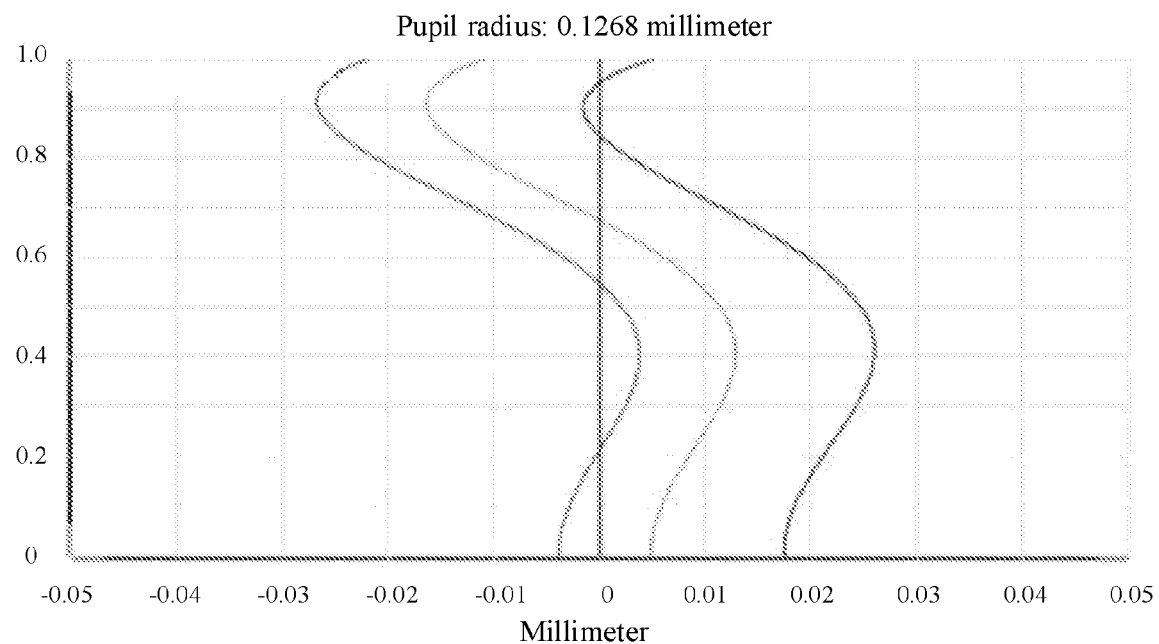
FIG. 6 is a diagram showing longitudinal aberration curves of the imaging lens system according to the second embodiment of the disclosure.
Figure 7:
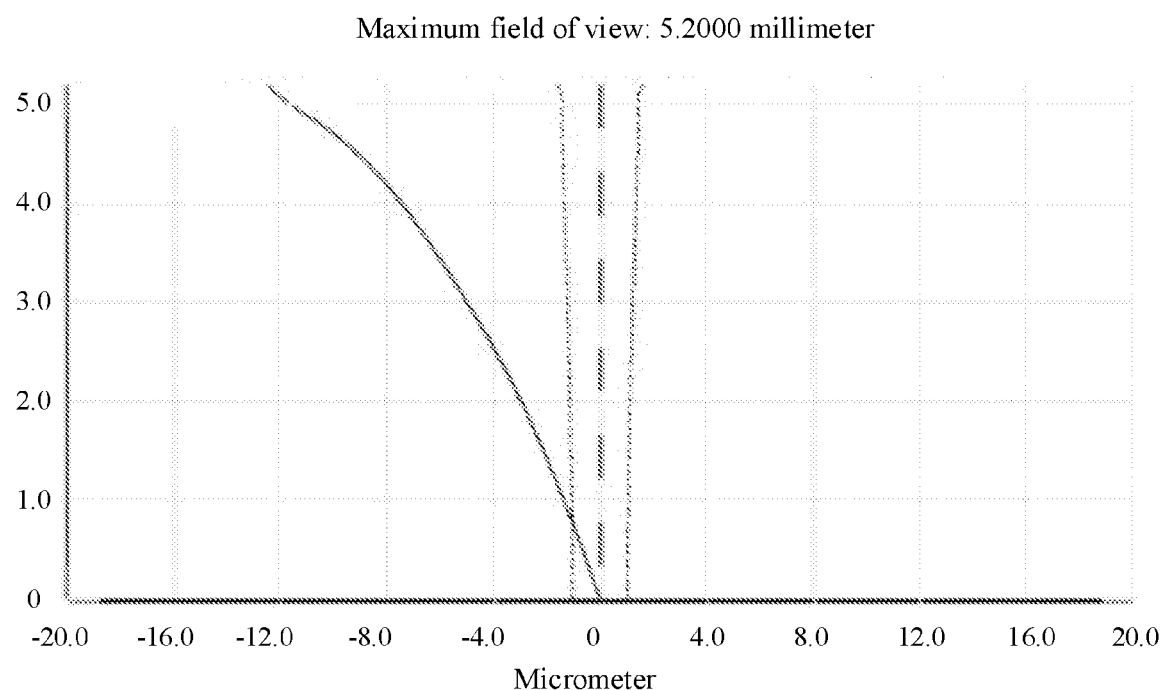
FIG. 7 is a diagram showing a lateral chromatic aberration curve of the imaging lens system according to the second embodiment of the disclosure.

Please refer to FIG. 5, a second embodiment of the disclosure provides an imaging lens system 200. From a measured object side to an image side, the imaging lens system 200 sequentially includes: a flat glass G1, a first lens L1, a second lens L2, a stop ST and a third lens L3.

The flat glass G1 has an object side surface S1 and an image side surface S2.

The first lens L1 has a negative focal power. The first lens L1 has an object side surface S3 and an image side surface S4, the object side surface S3 is convex, and the image side surface S4 is concave.

The second lens L2 has a positive focal power. The second lens L2 has an object side surface S5 and an image side surface S6, the object side surface S5 is convex, and the image side surface S6 is concave.

The third lens L3 has a positive focal power. The third lens L3 has an object side surface S7 and an image side surface S8, the object side surface S7 is convex, and the image side surface S8 is convex.

The imaging lens system 200 provided in the second embodiment of the disclosure follows those represented in the Table 2-1, Table 2-2-1 and Table 2-2. The imaging lens system 200 has a focal length f of 0.4 mm, a total optical length of 4.96 mm, an aperture number F # of 1.63, and a field of view 2θ of 129.3°.

Please refer to the Table 2-1, relevant parameters of every lens of the imaging lens system 100 provided in this embodiment are shown.

TABLE 2-1

| Surface No. | | Radius of curvature r | Surface Spacing d | Index of refraction $n_d$ | Abbe number Vd |
|---|---|---|---|---|---|
| | Object surface | — | | | |
| S1 | Flat glass G1 | Infinity | 1.465 | 1.5 | 64.1 |
| S2 | | Infinity | 1.030262 | | |
| S3 | First Lens L1 | 81.96693 | 0.351633 | 1.54 | 55.9 |
| S4 | | 0.388101 | 0.434028 | | |
| S5 | Second lens L2 | 0.819227 | 0.276469 | 1.66 | 20.3 |
| S6 | | 6.117929 | 0.130458 | | |
| ST | Stop ST | Infinity | 0.052282 | | |
| S7 | Third lens L3 | 1.671585 | 0.448552 | 1.64 | 23.5 |
| S8 | | −0.47751 | 0.371305 | | |
| S9 | Infrared cut-off filter G2 | Infinity | 0.145 | 1.52 | 54.5 |
| S10 | | Infinity | 0.241011 | | |
| S11 | Imaging plane | Infinity | | | |

Please refer to the Table 2-2-1 and Table 2-2-2, the surface coefficients of every aspherical surface of the imaging lens system 100 provided in this embodiment are shown.

TABLE 2-2-1

| Surface No. | k | $A_4$ | $A_6$ | $A_8$ |
|---|---|---|---|---|
| S3 | 100 | 0.1898 | −0.0788 | 0.0018 |
| S4 | −0.61558 | −0.2569 | 1.7437 | 6.7812 |
| S5 | −1.83995 | −0.692 | 3.573 | 245.069 |
| S6 | −109.697 | −1.067 | −0.738 | 12.003 |
| S7 | 1.181443 | −3.3459 | 73.1145 | −848.0762 |
| S8 | −0.5134 | 0.6560 | −1.3084 | 57.9193 |

TABLE 2-2-2

| Surface No. | $A_{10}$ | $A_{12}$ | $A_{14}$ | $A_{16}$ |
|---|---|---|---|---|
| S3 | 0.0141 | −0.0024 | −0.0013 | 0.0006 |
| S4 | −53.5235 | −8.1412 | −65.3269 | 61.1201 |
| S5 | −2065.903 | −2279.682 | 115221.850 | −398892.331 |
| S6 | 1.646 | −60.088 | −353.941 | 1033.427 |
| S7 | 3755.5143 | −90.1401 | −11791.2976 | −84813.9391 |
| S8 | −183.1473 | −244.8994 | −431.6975 | 6668.9905 |

In the above tables, $A_4$ represents a fourth order aspherical surface coefficient, $A_6$ represents a sixth order aspherical surface coefficient, $A_8$ represents an eighth order aspherical surface coefficient, $A_{10}$ represents a tenth order aspherical surface coefficient, $A_{12}$ represents a twelfth order aspherical surface coefficient, $A_{14}$ represents a fourteenth order aspherical surface coefficient, and $A_{16}$ represents a sixteenth order aspherical surface coefficient.

In this embodiment, the curves of the longitudinal aberration, the lateral chromatic aberration, the field curvature and the distortion are shown in FIG. 6, FIG. 7, FIG. 8a and FIG. 8b, respectively. The smaller data range of image points, the better performance of the system. From FIG. 6 to FIG. 8b, it is apparent that the longitudinal aberration, the lateral chromatic aberration, the field curvature and the distortion can be well corrected.

Embodiment 3

Figure 9:
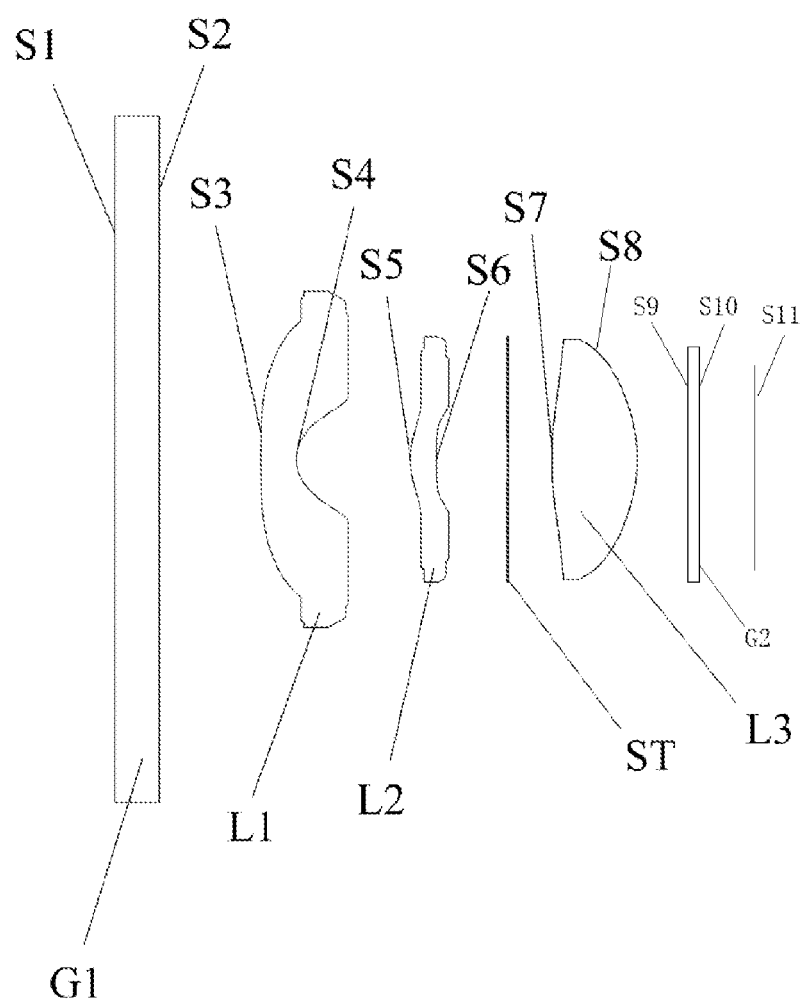
FIG. 9 is a schematic structural diagram of an imaging lens system according to a third embodiment of the disclosure.
Figure 10:
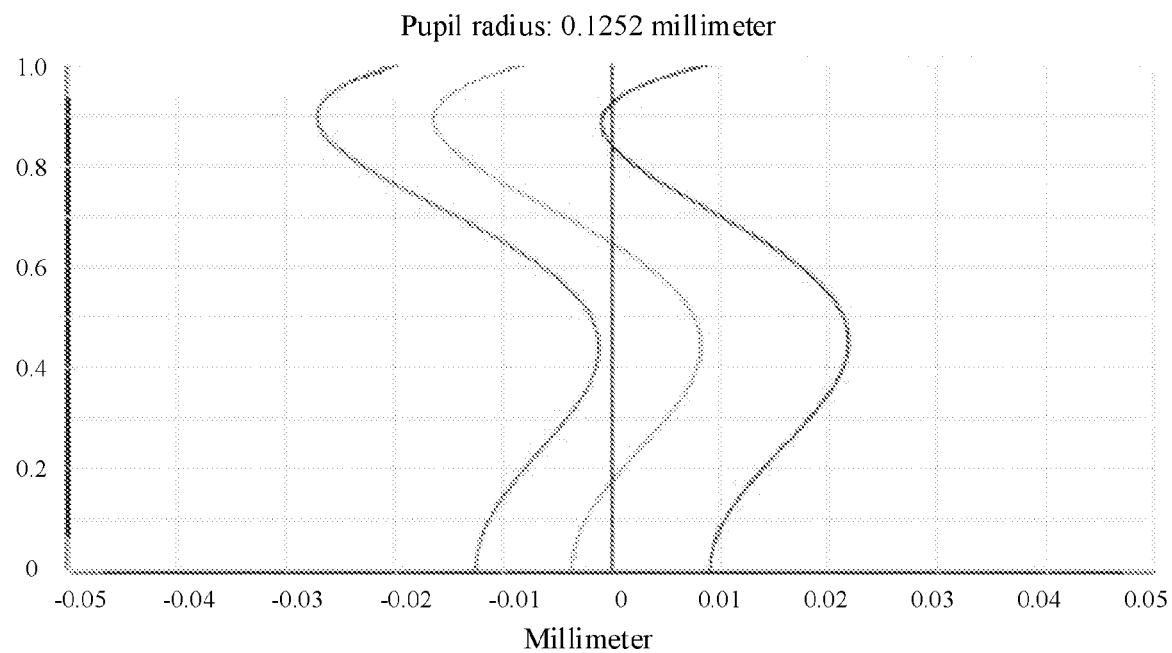
FIG. 10 is a diagram showing longitudinal aberration curves of the imaging lens system according to the third embodiment of the disclosure.
Figure 11:
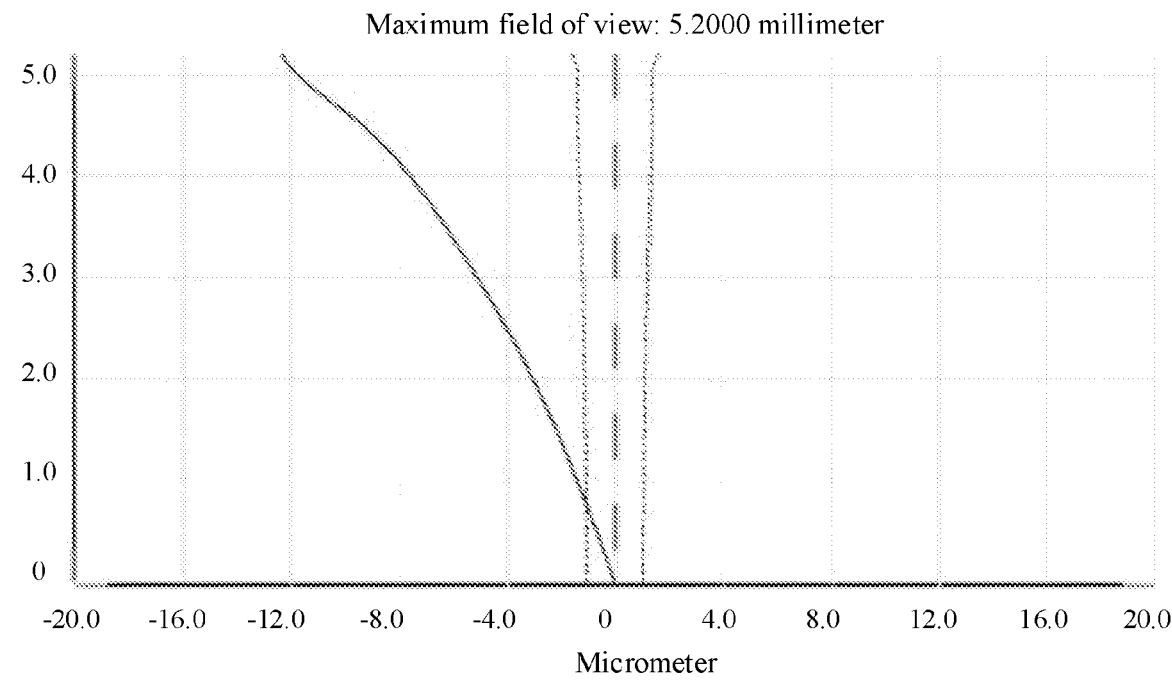
FIG. 11 is a diagram showing a lateral chromatic aberration curve of the imaging lens system according to the third embodiment of the disclosure.
Figure 12A:
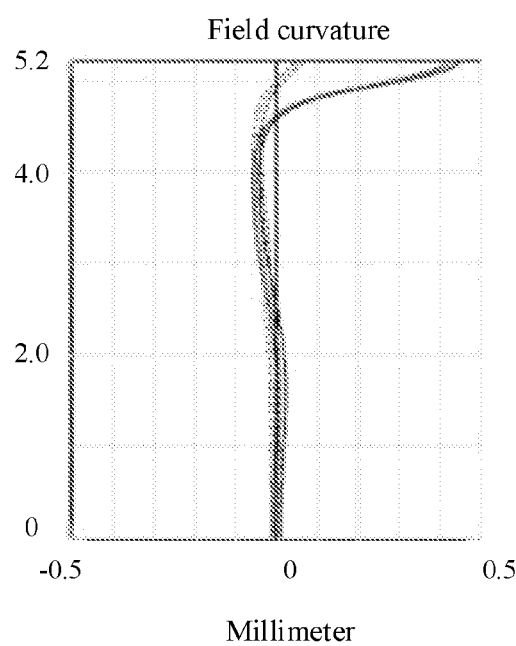
FIG. 12a is a diagram showing field curvature curves of the imaging lens system according to the third embodiment of the disclosure.
Figure 12B:
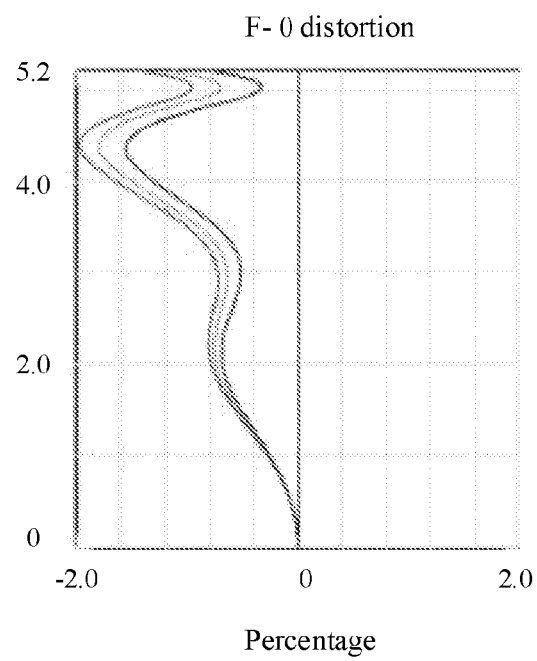
FIG. 12b is a diagram showing distortion curves of the imaging lens system according to the third embodiment of the disclosure.

Please refer to FIG. 9, a third embodiment of the disclosure provides an imaging lens system 300. From a measured object side to an image side, the imaging lens system 300 sequentially includes: a flat glass G1, a first lens L1, a second lens L2, a stop ST and a third lens L3.

The flat glass G1 has an object side surface S1 and an image side surface S2.

The first lens L1 has a negative focal power. The first lens L1 has an object side surface S3 and an image side surface S4, the object side surface S3 is convex, and the image side surface S4 is concave.

The second lens L2 has an object side surface S5 and an image side surface S6, the object side surface S5 is convex, and the image side surface S6 is concave.

The third lens L3 has a positive focal power. The third lens L3 has an object side surface S7 and an image side surface S8, the object side surface S7 is convex, and the image side surface S8 is convex.

The imaging lens system 300 provided in the third embodiment of the disclosure follows those represented in the Table 3-1, Table 3-2-1 and Table 3-2-2. The imaging lens system 300 has a focal length f of 0.39 mm, a total optical length of 4.96 mm, an aperture number F # of 1.64, and a field of view 2θ of 129°.

Please refer to the Table 3-1, relevant parameters of every lens of the imaging lens system 100 provided in this embodiment are shown.

TABLE 3-1

| Surface No. | | Radius of curvature r | Surface Spacing d | Index of refraction $n_d$ | Abbe number Vd |
|---|---|---|---|---|---|
| | Object surface | — | | | |
| S1 | Flat glass G1 | Infinity | 1.465 | 1.5 | 64.1 |
| S2 | | Infinity | 1.032915 | | |
| S3 | First Lens L1 | 15.44502 | 0.34576 | 1.54 | 55.9 |
| S4 | | 0.367038 | 0.437433 | | |
| S5 | Second lens L2 | 0.821523 | 0.268876 | 1.66 | 20.3 |
| S6 | | 4.981355 | 0.125227 | | |
| ST | Stop ST | Infinity | 0.052963 | | |
| S7 | Third lens L3 | 1.68992 | 0.440684 | 1.64 | 23.5 |
| S8 | | −0.47161 | 0.371305 | | |
| S9 | Infrared cut-off filter G2 | Infinity | 0.145 | 1.52 | 54.5 |
| S10 | | Infinity | 0.260862 | | |
| S11 | Imaging plane | Infinity | | | |

Please refer to the Table 3-2-1 and Table 3-2-2, the surface coefficients of every aspherical surface of the imaging lens system 100 provided in this embodiment are shown.

TABLE 3-2-1

| Surface No. | k | $A_4$ | $A_6$ | $A_8$ |
|---|---|---|---|---|
| S3 | 27.11193391 | 0.184 | −0.083 | 0.001 |
| S4 | −0.64913301 | 0.049 | 1.229 | 3.123 |

TABLE 3-2-1-continued

| Surface No. | k | $A_4$ | $A_6$ | $A_8$ |
|---|---|---|---|---|
| S5 | −2.46914161 | −1.136 | −0.231 | 11.602 |
| S6 | −57.3582578 | −0.670 | 2.495 | 262.362 |
| S7 | −0.24687717 | −3.397 | 74.891 | −837.677 |
| S8 | −0.54431485 | 0.739 | −2.284 | 58.531 |

TABLE 3-2-2

| Surface No. | $A_{10}$ | $A_{12}$ | $A_{14}$ | $A_{16}$ |
|---|---|---|---|---|
| S3 | 0.015 | −0.001 | −0.001 | 0.000 |
| S4 | −60.433 | −3.503 | −23.963 | 19.796 |
| S5 | −13.117 | −52.620 | −140.823 | 709.327 |
| S6 | −1404.864 | −4021.701 | 17889.232 | 235914.392 |
| S7 | 3766.854 | −311.300 | −13033.123 | −94159.949 |
| S8 | −156.210 | −148.448 | −448.642 | 4579.539 |

In the above tables, $A_4$ represents a fourth order aspherical surface coefficient, $A_6$ represents a sixth order aspherical surface coefficient, $A_8$ represents an eighth order aspherical surface coefficient, $A_{10}$ represents a tenth order aspherical surface coefficient, $A_{12}$ represents a twelfth order aspherical surface coefficient, $A_{14}$ represents a fourteenth order aspherical surface coefficient, and $A_{16}$ represents a sixteenth order aspherical surface coefficient.

In this embodiment, the curves of the longitudinal aberration, the lateral chromatic aberration, the field curvature and the distortion are shown in FIG. 10, FIG. 11, FIG. 12a and FIG. 12b, respectively. The smaller data range of image points, the better performance of the system. From FIG. 10 to FIG. 12b, it is apparent that the longitudinal aberration, the lateral chromatic aberration, the field curvature and the distortion can be well corrected.

Embodiment 4

Figure 13:
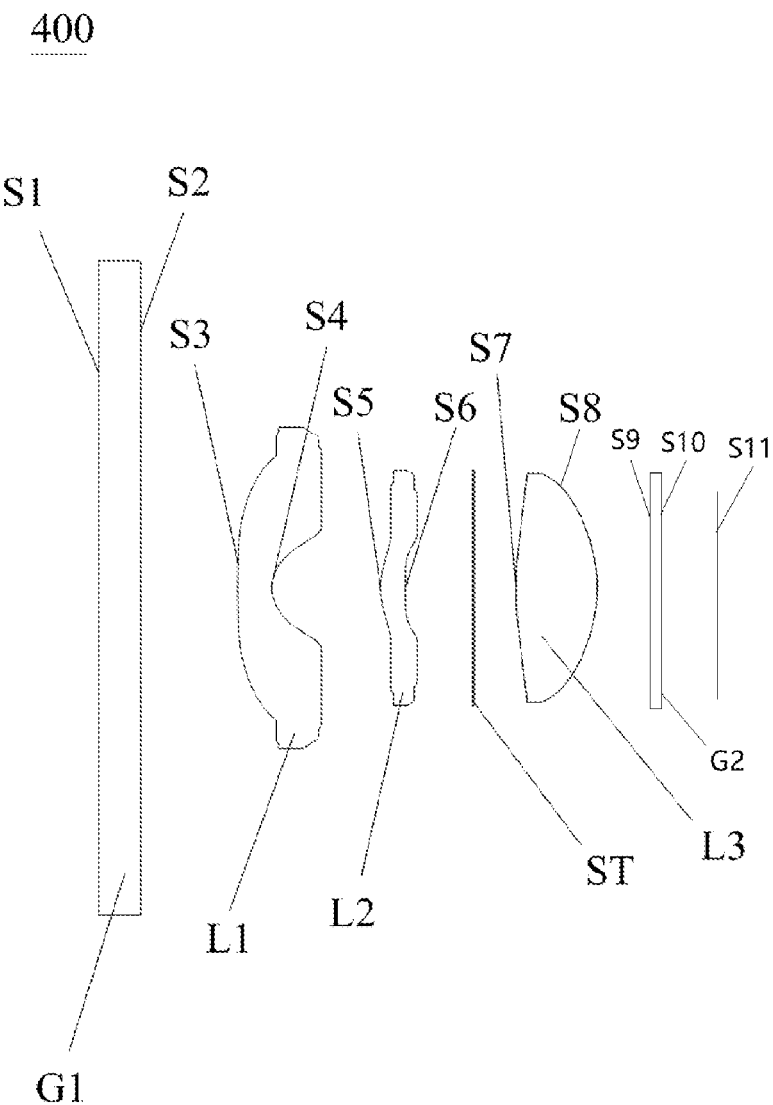
FIG. 13 is a schematic structural diagram of an imaging lens system according to a fourth embodiment of the disclosure.
Figure 14:
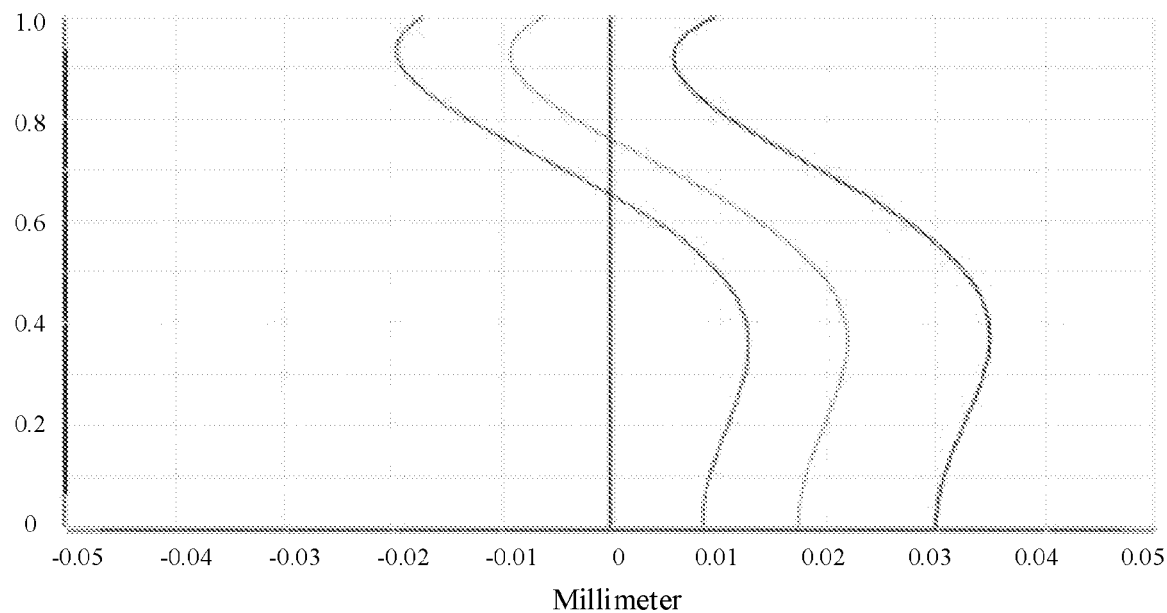
FIG. 14 is a diagram showing longitudinal aberration curves of the imaging lens system according to the fourth embodiment of the disclosure.
Figure 15:
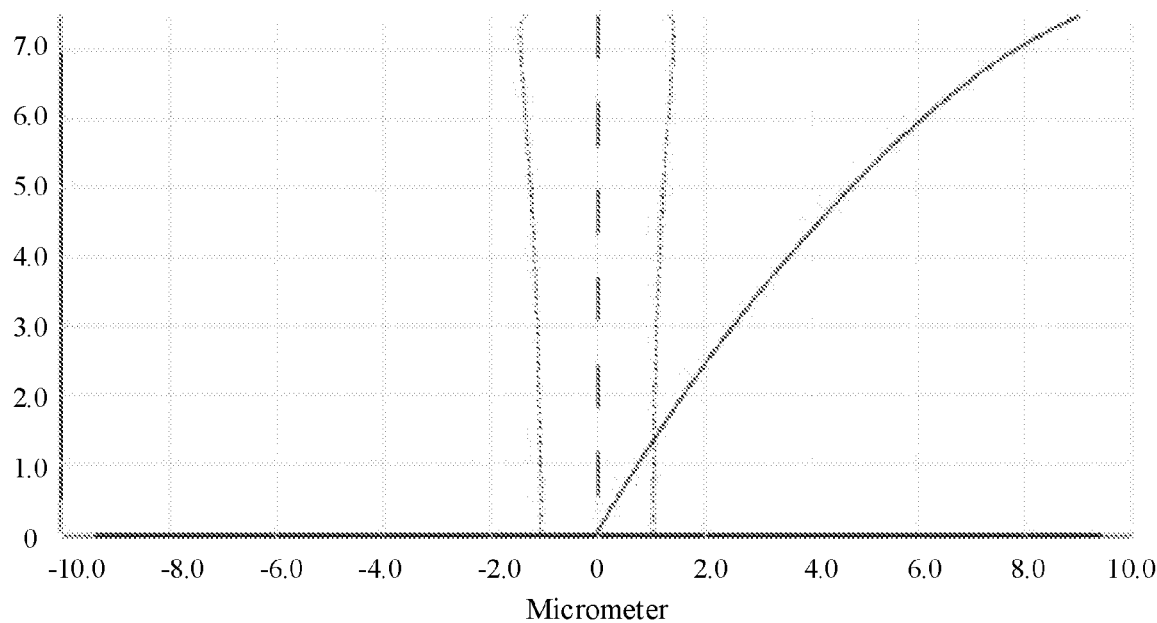
FIG. 15 is a diagram showing a lateral chromatic aberration curve of the imaging lens system according to the fourth embodiment of the disclosure.
Figure 16A:
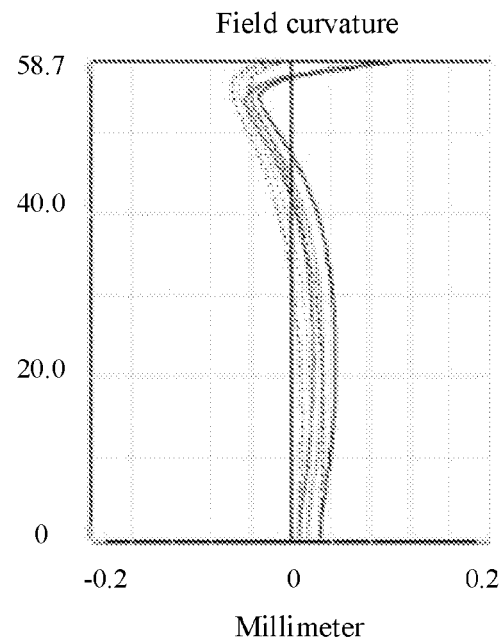
FIG. 16a is a diagram showing field curvature curves of the imaging lens system according to the fourth embodiment of the disclosure.
Figure 16B:
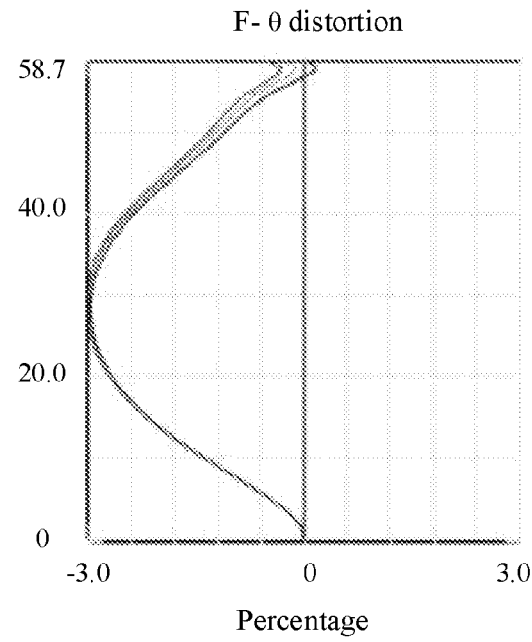
FIG. 16b is a diagram showing distortion curves of the imaging lens system according to the fourth embodiment of the disclosure.

Please refer to FIG. 13, a fourth embodiment of the disclosure provides an imaging lens system 400. From a measured object side to an image side, the imaging lens system 400 sequentially includes: a flat glass G1, a first lens L1, a second lens L2, a stop ST and a third lens U3.

The flat glass G1 has an object side surface S1 and an image side surface S2.

The first lens L1 has a negative focal power. The first lens L1 has an object side surface S3 and an image side surface S4, the object side surface S3 is convex, and the image side surface S4 is concave.

The second lens L2 has an object side surface S5 and an image side surface S6, the object side surface S5 is convex, and the image side surface S6 is concave.

The third lens L3 has a positive focal power. The third lens L3 has an object side surface S7 and an image side surface S8, and the image side surface S8 is convex.

The imaging lens system 400 provided in the third embodiment of the disclosure follows those represented in the Table 4-1, Table 4-2-1 and Table 4-2-2. The imaging lens system 400 has a focal length f of 0.46 mm, a total optical length of 5 mm, an aperture number F # of 1.63, and a field of view 2θ of 117.4°.

Please refer to the Table 4-1, relevant parameters of every lens of the imaging lens system 100 provided in this embodiment are shown.

TABLE 4-1

| Surface No. | | Radius of curvature r | Surface Spacing d | Index of refraction $n_d$ | Abbe number Vd |
|---|---|---|---|---|---|
| | Object surface | — | | | |
| S1 | Flat glass G1 | Infinity | 1.465 | 1.5 | 64.1 |
| S2 | | Infinity | 1.036545 | | |
| S3 | First Lens L1 | 3.658758 | 0.444835 | 1.54 | 55.9 |
| S4 | | 0.401266 | 0.402918 | | |
| S5 | Second lens L2 | 0.764708 | 0.255875 | 1.66 | 20.3 |
| S6 | | 3.142559 | 0.133399 | | |
| ST | Stop ST | Infinity | 0.051402 | | |
| S7 | Third lens L3 | 1.480399 | 0.458085 | 1.64 | 23.5 |
| S8 | | −0.49209 | 0.371305 | | |
| S9 | Infrared cut-off filter G2 | Infinity | 0.145 | 1.52 | 54.5 |
| S10 | | Infinity | 0.233395 | | |
| S11 | Imaging plane | Infinity | | | |

Please refer to the Table 4-2-1 and Table 4-2-2, the surface coefficients of every aspherical surface of the imaging lens system 100 provided in this embodiment are shown.

TABLE 4-2-1

| Surface No. | k | $A_4$ | $A_6$ | $A_8$ |
|---|---|---|---|---|
| S3 | −523.961643 | 0.198504035 | −0.076463241 | 0.002554797 |
| S4 | −0.62857903 | −0.318170615 | 1.714496234 | 6.870020964 |
| S5 | −1.38574652 | −0.982414487 | −0.617711078 | 12.92799715 |
| S6 | −10.0392892 | −0.615987551 | 4.299202766 | 242.5784082 |
| S7 | 11.67179224 | −2.885191525 | 56.71013491 | −707.8801739 |
| S8 | −0.55129965 | 0.765295369 | −1.525450995 | 55.25812508 |

TABLE 4-2-2

| Surface No. | $A_{10}$ | $A_{12}$ | $A_{14}$ | $A_{16}$ |
|---|---|---|---|---|
| S3 | 0.014372129 | −0.002333306 | −0.001286397 | 0.00058159 |
| S4 | −53.23130209 | −5.016706745 | −44.02244426 | 168.2470107 |
| S5 | 7.400968081 | −50.42246631 | −411.9872088 | 475.7167189 |
| S6 | −2037.781205 | −897.348783 | 137613.7335 | −581228.9604 |

TABLE 4-2-2-continued

| Surface No. | $A_{10}$ | $A_{12}$ | $A_{14}$ | $A_{16}$ |
|---|---|---|---|---|
| S7 | 4047.936776 | −5707.247715 | −43592.01152 | 136016.82 |
| S8 | −186.2604829 | −78.68306336 | 1018.305585 | −552.0942741 |

In the above tables, $A_4$ represents a fourth order aspherical surface coefficient, $A_6$ represents a sixth order aspherical surface coefficient, $A_8$ represents an eighth order aspherical surface coefficient, $A_{10}$ represents a tenth order aspherical surface coefficient, $A_{12}$ represents a twelfth order aspherical surface coefficient, $A_{14}$ represents a fourteenth order aspherical surface coefficient, and $A_{16}$ represents a sixteenth order aspherical surface coefficient.

In this embodiment, the curves of the longitudinal aberration, the lateral chromatic aberration, the field curvature and the distortion are shown in FIG. 14, FIG. 15, FIG. 16*a* and FIG. 16*b*, respectively. The smaller data range of image points, the better performance of the system. From FIG. 14 to FIG. 16*b*, it is apparent that the longitudinal aberration, the lateral chromatic aberration, the field curvature and the distortion can be well corrected.

Please refer to Table 5, Table 5 shows optical characteristics corresponding to the above first to fourth embodiments, including the focal length f, the total optical length, the aperture number F #, and the field of view 2θ.

TABLE 5

| Expression | Embodiment 1 | Embodiment 2 | Embodiment 3 | Embodiment 4 |
|---|---|---|---|---|
| f (mm) | 0.39 | 0.4 | 0.39 | 0.46 |
| Total optical length (mm) | 5.0 | 4.96 | 4.96 | 5 |
| F# | 1.6 | 1.63 | 1.64 | 1.63 |
| 2θ (°) | 132 | 129.3 | 129 | 117.4 |

According to the above results, it is apparent that the total optical lengths of the imaging lens system of each embodiment are all within 5 mm, that is, the maximum total optical length of the imaging lens system is 5 mm, which effectively shortens the total optical length of the system, thereby realizing the miniaturization of the system.

Embodiment 5

Figure 17:
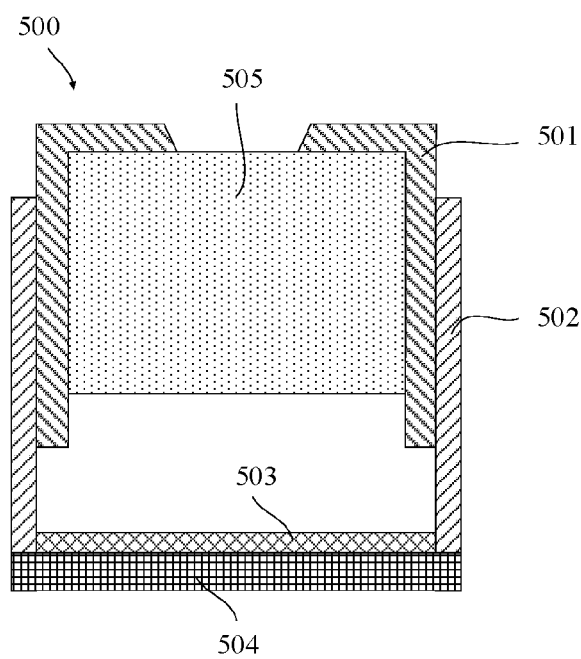
FIG. 17 is a schematic structural diagram of a camera module according to a fifth embodiment of the disclosure.

FIG. 17 illustrates a camera module 500, which includes a barrel 501, a holder 502, an image sensor 503, a printed circuit board 504, and the imaging lens system 505 of any embodiment as described above. The imaging lens system 505 is received in the barrel 501, and the barrel 501 is engaged with the holder 502. The image sensor 503 and the printed circuit board 504 are substantially accommodated in the holder 502. The image sensor 503 is opposite to the imaging lens system 505 and is mounted on the printed circuit board 504. The image sensor 503 is configured for converting light signals into electrical signals, thereby the images formed by the imaging lens system 505 can be converted and transmitted to a processor via the printed circuit board 504. The imaging component 500 as described above can be used as the image sensor 503 in this embodiment.

Embodiment 6

Figure 18:
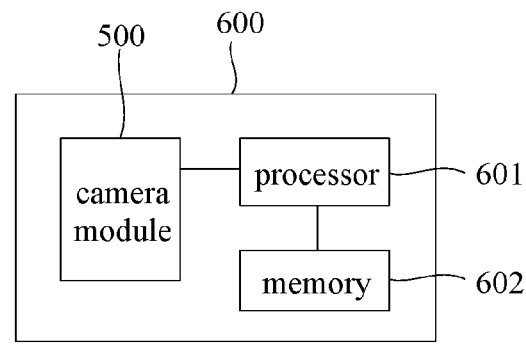
FIG. 18 is a schematic block diagram of a fingerprint recognition module according to a sixth embodiment of the disclosure.

As illustrated in FIG. 18, the disclosure further provides a fingerprint recognition module 600. The fingerprint recognition module 600 includes the camera module 500 as described above, a processor 601, and a memory 602. The processor 601 is communicated with the printed circuit board 504 and the memory 602, the memory 602 is configured to store the images captured by the camera module 500, and the processor 601 is configured to process the images captured by the camera module 500, thereby performing fingerprint recognition on the captured images.

Embodiment 7

Figure 19:
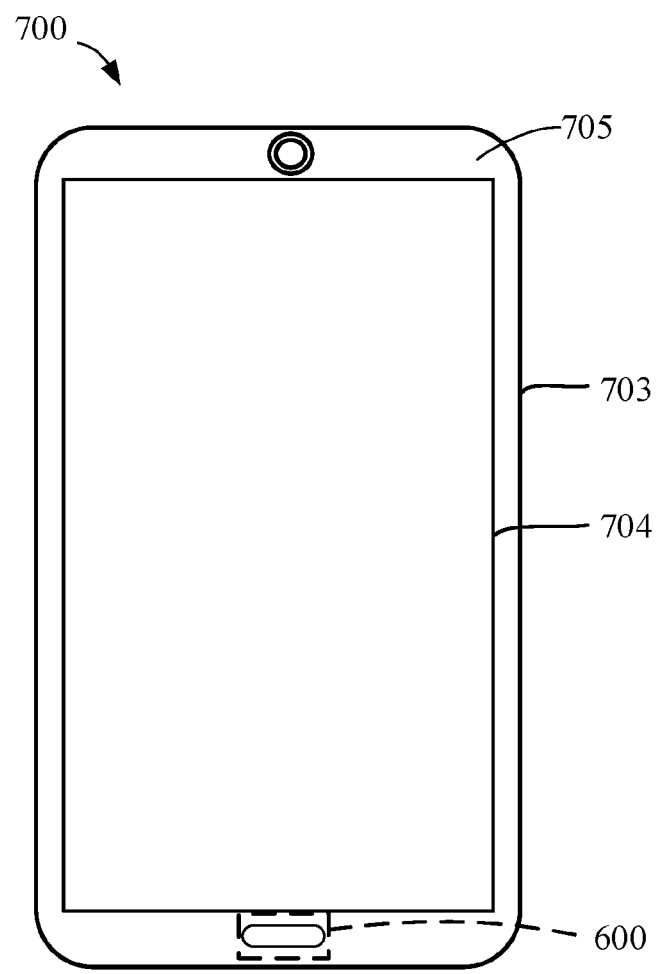
FIG. 19 is a schematic diagram of a mobile phone according to a seventh embodiment of the disclosure.

As illustrated in FIG. 19, an electronic device 700 may be a mobile phone, which includes the fingerprint recognition module 600, a housing 703, and a display screen 704. The fingerprint recognition module 600 is installed in the housing, and the display screen 704 is engaged with the housing 703. The mobile phone 600 has a front surface 705, the display screen 704 is exposed from the front surface 705, and the fingerprint recognition module 600 may be installed under the display screen 704.

One of ordinary skill in the art understands that the mobile phone 700 also includes other components, such as an antenna, a battery, a memory, an I/O module and so on.

In summary, in the optical imaging lens provided by the disclosure: the first lens has a negative focal power, an object side surface of the first lens is convex, and an image side surface of the first lens is concave; the second lens has a positive focal power, an object side surface of the second lens is convex, and an image side surface of the second lens is concave; the third lens has a positive focal power, an image side surface of the third lens is convex; the stop is disposed between the second lens and the third lens. The effective focal length represented by f and the entrance pupil diameter represented by EPD of the imaging lens system meet the expression: f/EPD≤1.64. By appropriately matching and defining each lens and the stop, the imaging lens system achieves a relative short total optical length of the imaging, thereby realizing the miniaturization of the system.

The above embodiments just express several implementation manners of the disclosure, and the descriptions thereof are relatively specific and detailed, but cannot be understood as limiting the scope of the disclosure. It should be noted that, for those of ordinary skill in the art, without departing from the concept of the disclosure, modifications and improvements can be made, and these all belong to the protection scope of the disclosure. Therefore, the scope of the disclosure should be subject to the appended claims.

What is claimed is:
1. An imaging lens system, from an object side to an imaging plane, sequentially comprising:
a flat glass;
a first lens with a negative focal power, an object side surface of the first lens being convex, an image side surface of the first lens being concave;
a second lens with a positive focal power, an object side surface of the second lens being convex, an image side surface of the second lens being concave;

a stop; and a third lens with a positive focal power, an image side surface of the third lens being convex;

wherein the imaging lens system meets expressions:

$f/EPD \leq 1.64;$ $0 < BFL/IH < 0.2;$ $-0.73 < (CT3-CT1)/(ET1-ET3) < -0.45;$ where f represents an effective focal length of the imaging lens system, EPD represents an entrance pupil diameter of the imaging lens system; BFL represents a distance from a vertex of the image side surface of the third lens to the imaging plane on an optical axis, IH represents a maximum image height of the imaging lens system; CT3 represents a center thickness of the third lens, CT1 represents a center thickness of the first lens, ET3 represents an edge thickness of the third lens, and ET1 represents an edge thickness of the first lens.

2. The imaging lens system as claimed in claim 1, wherein the imaging lens system meets the expression:

$1.36 < f3/f < 1.56;$ where f3 represents an effective focal length of the third lens.

3. The imaging lens system as claimed in claim 1, wherein the imaging lens system meets the expression:

$(ND3-ND2)/(VD3-VD2) < 0;$ where ND3 represents a refractive index of the third lens, ND2 represents a refractive index of the second lens, VD3 represents an abbe number of the third lens, and VD2 represents an abbe number of the second lens.

4. The imaging lens system as claimed in claim 1, wherein the imaging lens system meets the expression:

$0.3 < f3/f2 < 0.4;$ where f3 represents an effective focal length of the third lens, and f2 represents an effective focal length of the second lens.

5. The imaging lens system as claimed in claim 1, wherein the imaging lens system meets the expression:

$-2 < (R32-R31)/(R32+R31) < -1.3;$ where R32 represents a radius of curvature of the image side surface of the third lens, and R31 represents a radius of curvature of an object side surface of the third lens.

6. The imaging lens system as claimed in claim 1, wherein the imaging lens system meet the following expressions:

$f < 1.0 \text{ mm};$ $FOV > 100°;$ where FOV represents a maximum field of view of the imaging lens system.

7. The imaging lens system as claimed in claim 1, wherein the imaging lens system meets the expression:

$R11 > R12;$ where R11 represents a radius of curvature of the object side surface of the first lens and R12 represents a radius of curvature of the image side surface of the first lens.

8. The imaging lens system as claimed in claim 1, wherein the imaging lens system meets the expression:

$CT1 < CT3.$

9. The imaging lens system as claimed in claim 1, wherein the imaging lens system meets the expression:

$CT1 < ET1.$

10. The imaging lens system as claimed in claim 1, wherein the imaging lens system meets the expressions:

$D1 > D2;$ $D1 > D3;$ where D1 represents a maximum diameter of the first lens, D2 represents a maximum diameter of the second lens, and D3 represents a maximum diameter of the third lens.

11. The imaging lens system as claimed in claim 1, wherein the image side surface of the first lens comprises a curved surface and an annular flat surface surrounding the curved surface.

12. A camera module, comprising an imaging lens system and an image sensor opposite to the imaging lens system, the imaging lens system consisting of:

a flat glass;

a first lens with a negative focal power, an object side surface of the first lens being convex, an image side surface of the first lens being concave;

a second lens with a positive focal power, an object side surface of the second lens being convex, an image side surface of the second lens being concave;

a stop;

a third lens with a positive focal power, an image side surface of the third lens being convex; and an infrared cut-off filter disposed between the third lens and an imaging plane;

wherein the imaging lens system meets the expression:

$f/EPD \leq 1.64;$ where f represents an effective focal length of the imaging lens system, and EPD represents an entrance pupil diameter of the imaging lens system.

13. The camera module as claimed in claim 12, wherein the imaging lens system meets the expression:

$0 < BFL/IH < 0.2;$ where BFL represents a distance from a vertex of the image side surface of the third lens to the imaging plane on an optical axis, and IH represents a maximum image height of the imaging lens system.

14. The camera module as claimed in claim 12, wherein the imaging lens system meets the expression:

$-0.73 < (CT3-CT1)/(ET1-ET3) < -0.45;$ where CT3 represents a center thickness of the third lens, CT1 represents a center thickness of the first lens, ET3 represents an edge thickness of the third lens, and ET1 represents an edge thickness of the first lens.

15. The camera module as claimed in claim 12, wherein the imaging lens system meets the expression:

$1.36 < f3/f < 1.56;$ $0.3 < f3/f2 < 0.4;$ where f3 represents an effective focal length of the third lens, and f2 represents an effective focal length of the second lens.

16. The camera module as claimed in claim 12, wherein the imaging lens system meets the expression:

$(ND3-ND2)/(VD3-VD2) < 0;$ where ND3 represents a refractive index of the third lens, ND2 represents a refractive index of the second lens, VD3 represents an abbe number of the third lens, and VD2 represents an abbe number of the second lens.

17. The camera module as claimed in claim 12, wherein the imaging lens system meets the expression:

$$-2<(R32-R31)/(R32+R31)<-1.3;$$

where R32 represents a radius of curvature of the image side surface of the third lens, and R31 represents a radius of curvature of an object side surface of the third lens.

18. A fingerprint recognition module, comprising a camera module, a memory and a processor, the memory and the camera module being electrically connected with the processor, the memory being configured to store image data, the processor being configured to process the image data, the camera module comprising an imaging lens system and an image sensor, the image sensor being opposite to the imaging lens system and configured to sense and generate the image data, from an object side to an imaging plane, the imaging lens system sequentially comprising:

a flat glass;
a first lens with a negative focal power, an object side surface of the first lens being convex, an image side surface of the first lens being concave;
a second lens with a positive focal power, an object side surface of the second lens being convex, an image side surface of the second lens being concave;
a stop; and
a third lens with a positive focal power, an image side surface of the third lens being convex;
wherein the imaging lens system meets the expressions:

$$f/EPD \leq 1.64;$$

$$0<BFL/IH<0.2;$$

where f represents an effective focal length of the imaging lens system, EPD represents an entrance pupil diameter of the imaging lens system; BFL represents a vertex of the image side surface of the third lens to the imaging plane on an optical axis, and IH represents a maximum image height of the imaging lens system.

* * * * *